Nov. 18, 1952 W. E. WITHALL 2,618,393
SHOCK ABSORBING MECHANISM FOR RAILWAY DRAFT RIGGINGS
Filed March 1, 1951 3 Sheets-Sheet 2
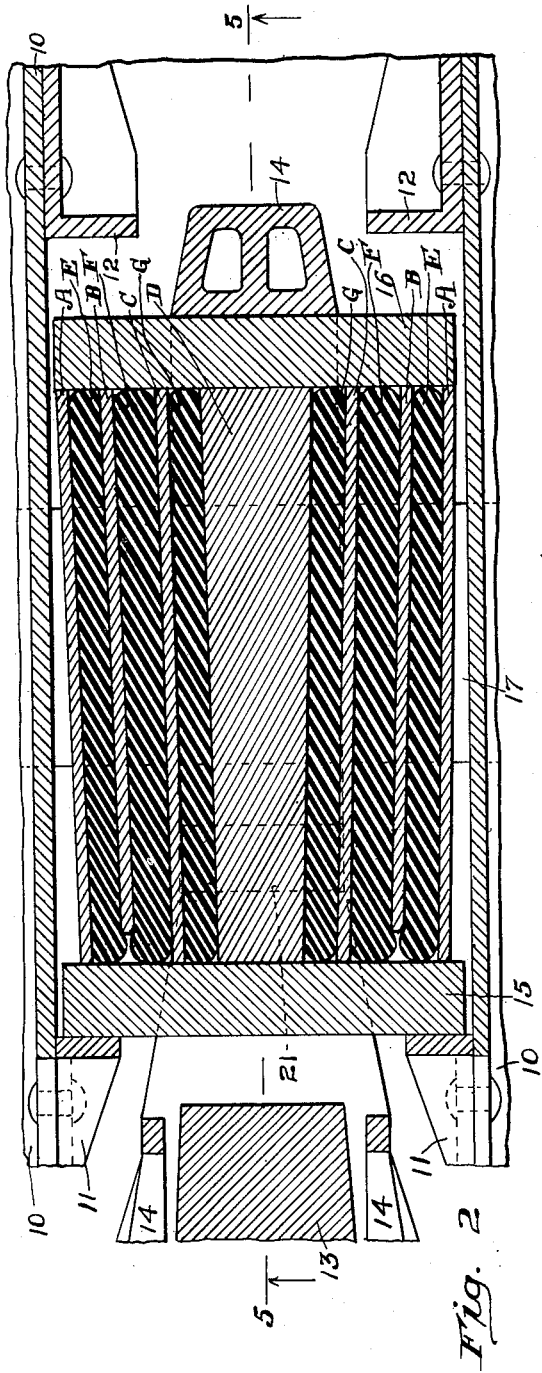
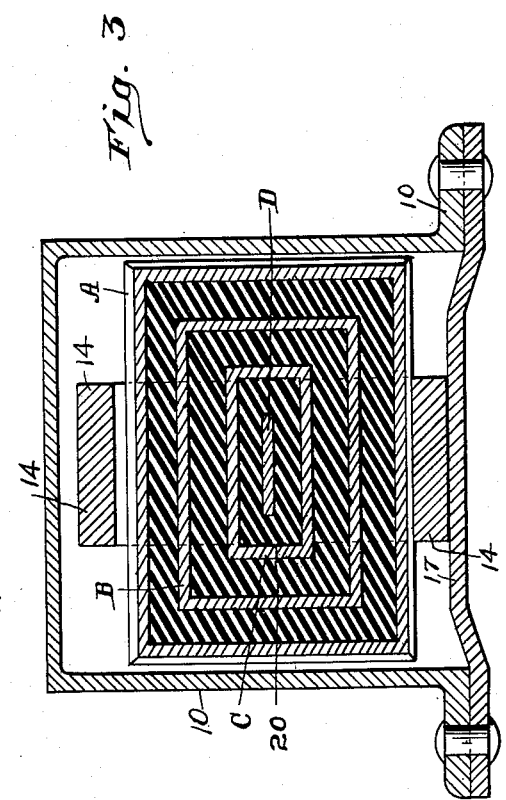
Inventor:
William E. Withall.
By Henry Fuchs
Atty.

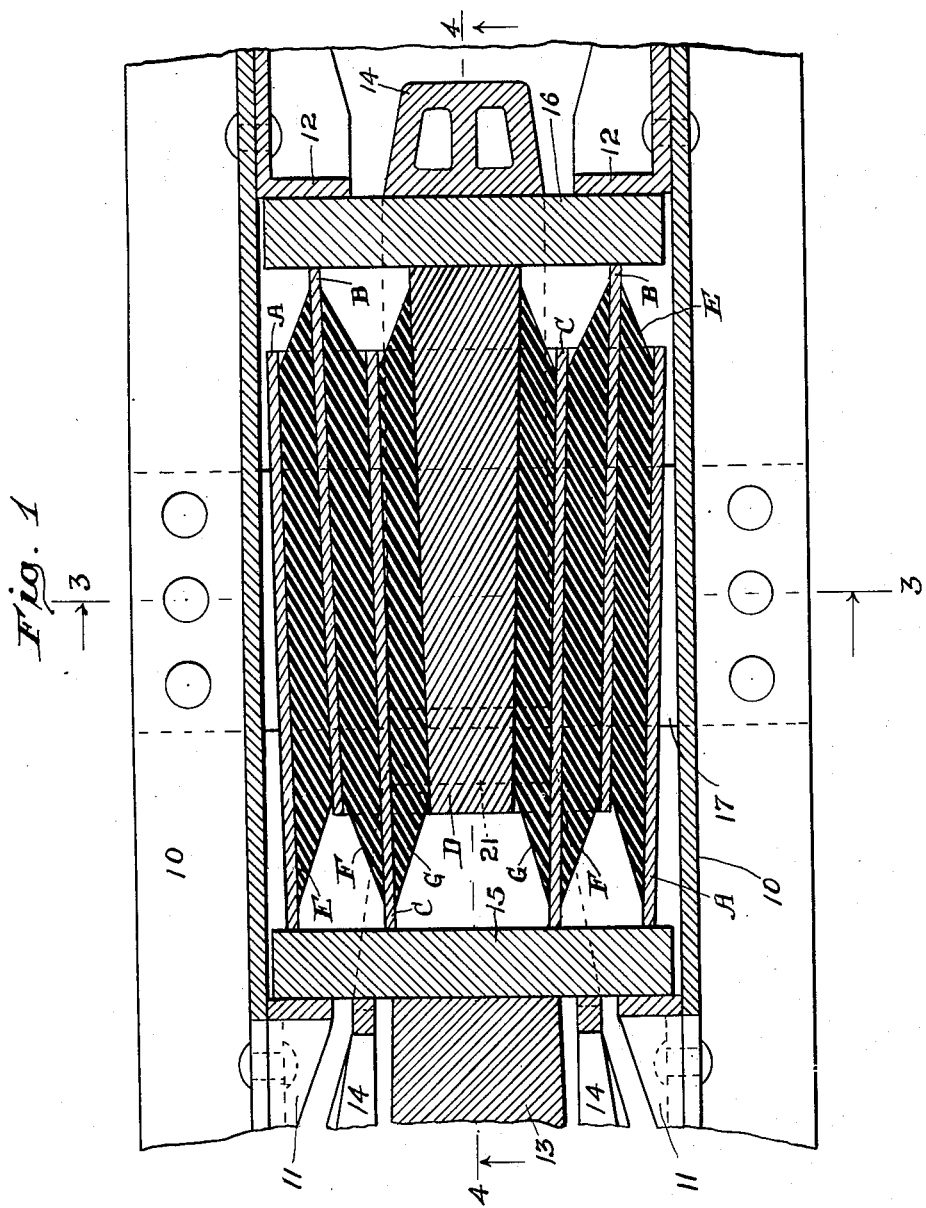

Nov. 18, 1952 W. E. WITHALL 2,618,393
SHOCK ABSORBING MECHANISM FOR RAILWAY DRAFT RIGGINGS
Filed March 1, 1951 3 Sheets-Sheet 3

Inventor:
William E. Withall.
By Henry Fuchs
Atty.

Patented Nov. 18, 1952

2,618,393

UNITED STATES PATENT OFFICE 2,618,393

SHOCK ABSORBING MECHANISM FOR RAILWAY DRAFT RIGGINGS

William E. Withall, Hinsdale, Ill., assignor to W. H. Miner, Inc., Chicago, Ill., a corporation of Delaware Application March 1, 1951, Serial No. 213,379

1 Claim. (Cl. 213—44)

This invention relates to improvements in shock absorbing mechanisms especially adapted for draft riggings of railway cars.

One object of the invention is to provide a shock absorbing mechanism employing rubber elements subjected to both compression and shear to yieldingly resist shocks.

A further object of the invention is to provide a shock absorbing mechanism of the character indicated, comprising rubber pads extending lengthwise of the mechanism and alternated with metal spacing members, to which the pads are vulcanized, wherein the spacing members are movable lengthwise with respect to each other during compression of the mechanism to subject the pads to both compression and shear, thereby providing relatively high shock absorbing capacity.

Still another object of the invention is to provide a shock absorbing mechanism, as set forth in the preceding paragraph, wherein the rubber pads are subjected to lateral compression through relative lateral approach of the spacing members during compression of the mechanism, thereby materially increasing the shock absorbing capacity of the device.

A more specific object of the invention is to provide a shock absorbing mechanism comprising a plurality of lengthwise extending, alternated rubber pads and spacing members interposed between front and rear followers, relatively movable lengthwise of the mechanism, wherein the spacing members comprise telescoped, lengthwise tapered, hollow tubular members of rectangular, transverse cross section to which opposite sides of the interposed pads are vulcanized, the spacing members being arranged for relative movement with respect to each other, whereby the rubber pads, in addition to being placed under shear, are subjected to high lateral compression through squeezing action exerted by the tapered spacing members during lengthwise compression of the mechanism.

Other objects of the invention will more clearly appear from the description and claim hereinafter following.

Figure 4:
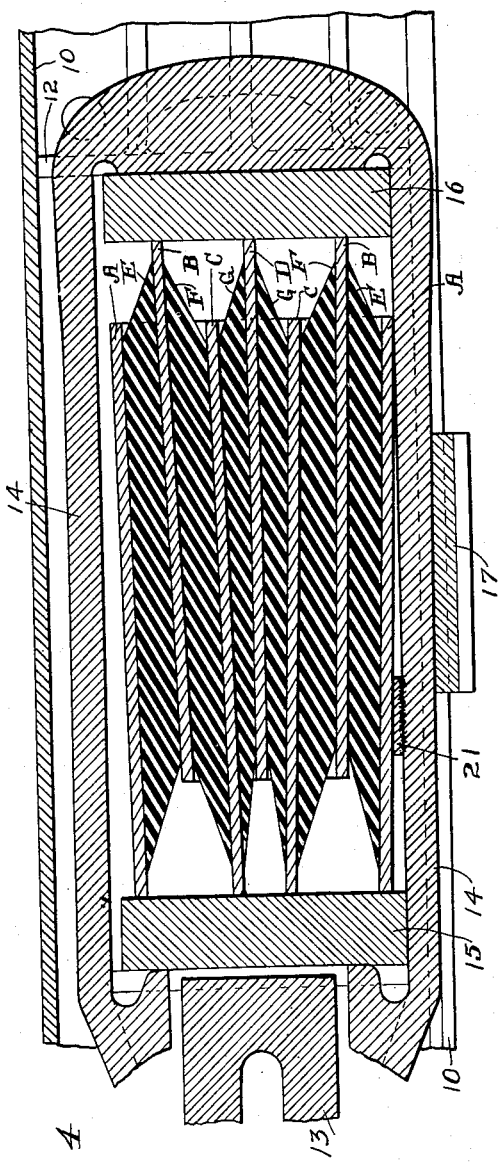
Figure 5:
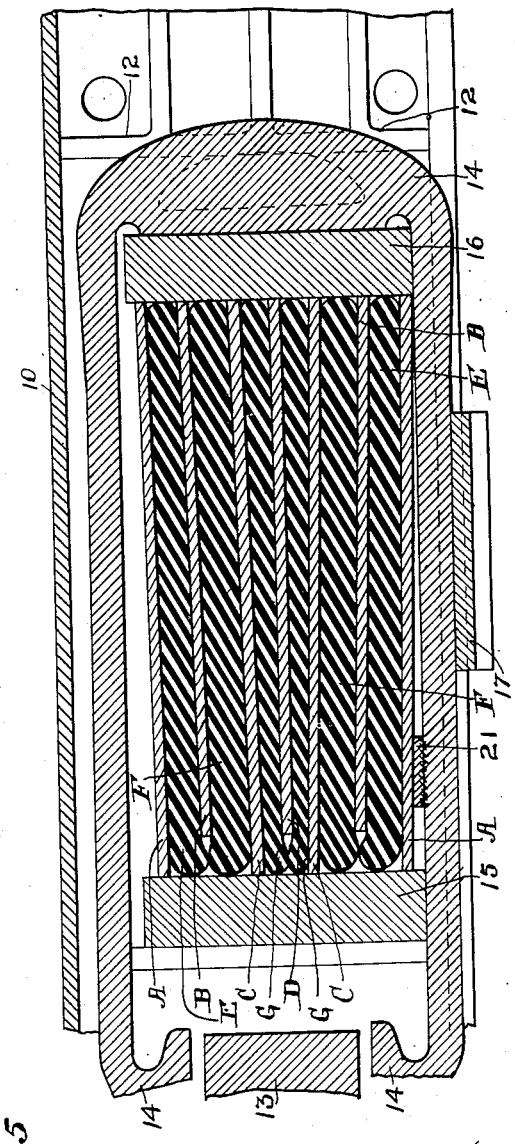

In the accompanying drawings forming a part of this specification, Figure 1 is a horizontal, longitudinal sectional view, through a portion of the underframe structure at one end of a railway car, illustrating my improved shock absorbing mechanism in connection therewith. Figure 2 is a horizontal, longitudinal sectional view, similar to Figure 1, showing the shock absorbing mechanism fully compressed. Figure 3 is a transverse, vertical sectional view, corresponding substantially to the line 3—3 of Figure 1. Figure 4 is a longitudinal, vertical sectional view, corresponding substantially to the line 4—4 of Figure 1. Figure 5 is a longitudinal, vertical sectional view, corresponding substantially to the line 5—5 of Figure 2.

In said drawings, 10 indicates the longitudinally extending center or draft sill of a railway car underframe structure, having the usual bottom flanges as shown in Figure 1. On the inner sides, the sill is provided with front and rear stop lugs 11—11 and 12—12, commonly employed in draft riggings. The rear portion of the usual coupler shank is indicated by 13, to which is operatively connected a yoke 14 of well-known construction. My improved shock absorbing mechanism and the cooperating front and rear followers 15 and 16 are disposed within the yoke, the followers 15 and 16 cooperating, respectively, with the front and rear stop lugs 11—11 and 12—12 in the usual manner. A saddle plate 17, secured to the bottom flanges of the sill 10 underlies the yoke 14 and supports the latter and the parts contained therein.

My improved shock absorbing mechanism comprises broadly a plurality of spacing members or sleeves A, B, and C, a central, lengthwise extending, spacing plate D, and a plurality of rubber pads E, F, and G alternated with the sleeves A, B, C, and plate D.

The sleeves A, B, and C are preferably in the form of metal casings open at the front and rear ends and are all of rectangular, transverse cross section, being arranged lengthwise of the mechanism, and each sleeve or casing is tapered lengthwise, that is, flared rearwardly. The sleeve B is disposed within the sleeve A and the sleeve C is disposed within the sleeve B. In other words, these three sleeves are telescopically arranged. As clearly illustrated in Figures 1, 2, 4, and 5, the sleeves A and C are of the same length. The sleeve B is shorter than the sleeves A and C and when the mechanism is fully compressed, as shown in Figures 2 and 5, has its front end spaced from the front follower 15.

The sleeves A, B, and C are of progressively decreasing, transverse, cross sectional size and the walls of the sleeves A and B are preferably spaced the same distance apart as the walls of the sleeves C and B.

The plate D is substantially flat and tapered lengthwise, as shown in Figures 1 and 2. This plate is disposed horizontally and is arranged within the sleeve C. The tapered plate D corresponds in length to the sleeves A and C, and has its side edges parallel to the vertical side walls 20—20 of the sleeve C.

The rubber pads E, F, and G are in the form of hollow sleeves or casings, and are also of rectangular, transverse, cross section, and taper lengthwise, the pad E being disposed within the sleeve A and surrounding the sleeve B, the rubber pad F being disposed within the sleeve B and surrounding the sleeve C, and the rubber pad G being disposed within the sleeve C and surrounding the plate D. The pad E is vulcanized to the walls of the sleeves A and B, the pad F is vulcanized to the walls of the sleeves B and C, and the pad G is vulcanized to the plate D and the walls of the sleeve C.

As shown in Figure 1, the front and rear ends of the walls of the rubber pads E, F, and G are beveled off, the front ends of the pads E and G being inclined laterally outwardly, the front end of the pad F being inclined laterally inwardly, the rear ends of the pads E and G being inclined laterally inwardly, and the rear end of the pad F being inclined laterally outwardly.

As hereinbefore mentioned, my improved shock absorbing mechanism is disposed within the yoke 14 between the front and rear followers 15 and 16. In the expanded condition of the mechanism illustrated in Figures 1 and 4, the front ends of the sleeves A and C are in abutment with the front follower 15, and the rear end of the sleeve B and the rear end of the plate D are in abutment with the rear follower 16.

As most clearly shown in Figures 4 and 5, the front end of the outer casing A is supported by a filler block 21 welded to the bottom arm of the yoke 14 to maintain the proper positioning of the shock absorbing mechanism or unit within the yoke, that is, with the bottom wall of the sleeve A inclined upwardly in forward direction.

The operation of my improved shock absorbing mechanism is as follows: Assuming that a draft or pulling force is applied to the coupler 13, thereby moving the same and the yoke 14, together with the rear follower 16, forwardly toward the front follower 15, which is at this time held stationary by the front stop lugs 11—11, the sleeve B and the plate D will be moved forwardly until the compression of the mechanism is arrested, as shown in Figure 2 by engagement of the front end of the plate D with the front follower 15 and the rear ends of the sleeves A and C by the rear follower 16. When the mechanism has been thus compressed, the casings A and C and the plate D act as column members to transmit the actuating force directly from the rear follower 16 to the front follower 15 of the draft rigging, thereby preventing excessive compression of the rubber pads E, F, and G. While the mechanism is thus being compressed lengthwise, the rubber pads will be compressed laterally, due to the wedging action between the tapered sleeves A, B, and C and the plate D, and also stretched lengthwise or placed under shear through lengthwise relative movement of the sleeves to which the pads are vulcanized. The shocks imparted to the mechanism will thus be properly cushioned, due to the inherent resiliency of the rubber pads.

When the actuating force is reduced, the tendency of the distorted rubber pads to return to their normal shape will return the sleeves A, B, and C and the plate D to the full release position of the mechanism, as shown in Figure 1.

The operation in buff is the same as in draft, with the exception that the front follower 15 is moved inwardly, the rear follower 16 remains stationary, and that the sleeves A and C are moved rearwardly with the front follower 15 until they engage the rear follower 16 and the plate D is engaged by the front follower.

I claim:

In a shock absorbing mechanism adapted to be interposed between front and rear follower members of a railway draft rigging, the combination with a lengthwise extending, outer, rectangular metal sleeve, said sleeve being tapered lengthwise; of a second lengthwise extending, rectangular metal sleeve disposed within said first named sleeve and tapered in the same direction as said first named metal sleeve; a rectangular rubber sleeve surrounding said second named metal sleeve and embraced by said first named metal sleeve and vulcanized to said sleeves; a third lengthwise extending rectangular metal sleeve disposed within said second named metal sleeve and tapered in the same direction as said first and second named metal sleeves; a second rectangular rubber sleeve embraced between said second and third named metal sleeves and vulcanized to the same; a lengthwise extending spacing plate member within said third named metal sleeve, said plate member being of uniform thickness throughout its length and of tapering width lengthwise to correspond with the taper of said third named metal sleeve; and a third rubber sleeve surrounding said spacing member and embraced by said third named metal sleeve and vulcanized to said spacing member and third named metal sleeve, said first and third named metal sleeves being relatively movable in lengthwise direction with respect to said second named metal sleeve, said first and third named metal sleeves bearing on said front follower member and being spaced from said rear follower member, and said second named metal sleeve bearing on said rear follower member and being spaced from said front follower member, said spacing plate member bearing at its rear end on said rear follower member and having its front end spaced from said front follower member.

WILLIAM E. WITHALL.

REFERENCES CITED

The following references are of record in the file of this patent:

UNITED STATES PATENTS

| Number | Name | Date |
|---|---|---|
| 2,126,707 | Schmidt | Aug. 16, 1938 |
| 2,165,375 | Heitner | July 11, 1939 |
| 2,260,508 | Chambers | Oct. 28, 1941 |

FOREIGN PATENTS

| Number | Country | Date |
|---|---|---|
| 756,981 | France | Dec. 18, 1933 |